US012668428B2

(12) United States Patent
Nakashima et al.

(10) Patent No.: US 12,668,428 B2
(45) Date of Patent: Jun. 30, 2026

(54) TRANSPORT CONVEYOR AND TRANSPORT APPARATUS EQUIPPED WITH TRANSPORT CONVEYOR

(71) Applicant: Daifuku Co., Ltd., Osaka (JP)

(72) Inventors: Kouichirou Nakashima, Hinocho (JP); Yuki Matsuda, Hinocho (JP); Shinya Hasaka, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 772 days.

(21) Appl. No.: 17/957,241

(22) Filed: Sep. 30, 2022

(65) Prior Publication Data

US 2023/0106621 A1 Apr. 6, 2023

(30) Foreign Application Priority Data

Oct. 1, 2021 (JP) ................................. 2021-162633

(51) Int. Cl.
*B65G 1/137* (2006.01)
*B65G 15/12* (2006.01)
*B65G 65/00* (2006.01)

(52) U.S. Cl.
CPC ........... *B65G 1/1376* (2013.01); *B65G 15/12* (2013.01); *B65G 65/00* (2013.01)

(58) Field of Classification Search
CPC ...... B65G 15/12; B65G 15/20; B65G 1/0492; B65G 2812/02039; B65G 1/0485
See application file for complete search history.

(56) References Cited

U.S. PATENT DOCUMENTS

| | | | | |
|---|---|---|---|---|
| 3,650,376 | A * | 3/1972 | Burgis | B65G 47/268 198/721 |
| 3,685,635 | A * | 8/1972 | Johnson | B66B 29/08 198/324 |
| 3,712,457 | A | 1/1973 | Pelzer | |
| 4,508,484 | A * | 4/1985 | Heiz | B65G 65/00 414/337 |
| 6,607,064 | B2 * | 8/2003 | Inoue | B66B 21/10 198/324 |
| 2016/0090243 | A1 | 3/2016 | Aliesch | |

FOREIGN PATENT DOCUMENTS

| | | |
|---|---|---|
| CN | 204528356 U | 8/2015 |
| JP | 6359120 U | 4/1988 |
| JP | 496415 U | 8/1992 |
| JP | H0496415 U * | 8/1992 |

(Continued)

*Primary Examiner* — Timothy R Waggoner
(74) *Attorney, Agent, or Firm* — The Webb Law Firm

(57) ABSTRACT

The endless path includes: a first region extending linearly in the transport direction and constituting a transport surface on which the object to be transported is placeable, turn-back regions in which the endless path is turned back downward from respective end portions of the first region in the transport direction; and a second region continuous with the turn-back regions and extending in the transport direction below the first region, and the second region has, between the two support legs in the transport direction, a specific zone that is parallel with the first region and in which a spacing from the first region in an up-down direction is smaller than a smallest turn-back dimension corresponding to twice a smallest bending radius of the endless member.

5 Claims, 4 Drawing Sheets

(56) References Cited

FOREIGN PATENT DOCUMENTS

| JP | 201647744 A | | 4/2016 |
| JP | 201669191 A | | 5/2016 |
| JP | 3214492 U | | 1/2018 |
| JP | 201914583 A | | 1/2019 |
| JP | 2019014583 A | * | 1/2019 |
| JP | 2019167183 A | | 10/2019 |

* cited by examiner

TRANSPORT CONVEYOR AND TRANSPORT APPARATUS EQUIPPED WITH TRANSPORT CONVEYOR

CROSS REFERENCE TO RELATED APPLICATION

The application claims priority to Japanese Patent Application No. 2021-162633, filed Oct. 1, 2021, the disclosure of which is hereby incorporated by reference in its entirety.

BACKGROUND OF THE INVENTION

1. Field of the Invention

The present invention relates to a transport conveyor for transporting an object to be transported in a transport direction, and a transport apparatus equipped with the transport conveyor.

2. Description of the Related Art

For example, JP 2016-047744A (Patent Document 1) discloses a facility for loading and unloading objects to be transported into and from an automated warehouse. In the following, the reference numerals in parentheses in the description of the background section are those used in Patent Document 1.

The facility disclosed in Patent Document 1 includes an automated warehouse (2), transport conveyors (21) for loading and unloading objects to be transported (9) into and from the automated warehouse (2), and transport vehicles (1) that travel in a traveling area (Z1) of a floor surface of the facility and transport the objects to be transported (9).

When an object to be transported (9) is loaded into the automated warehouse (2), the object to be transported (9) is transported by a transport vehicle (1) and delivered to a transport conveyor (21). The object to be transported (9) is then transported to the automated warehouse (2) by the transport conveyor (21). The automated warehouse (2) has a transport means such as a stacker crane, which transfers the object to be transported (9) to a rack or the like in the automated warehouse (2). When an object to be transported (9) is unloaded from the automated warehouse (2), the reverse operation is performed.

Each transport conveyor (21) receives and delivers an object to be transported (9) from and to a transport vehicle (1) and the transport means in the automated warehouse (2) as mentioned above. It is preferable that the height of the transport conveyor (21) is maintained at a height that is predetermined in the facility so that the object to be transported (9) is appropriately received and delivered. Here, in this technical field, there is a need to effectively use the space below the transport conveyors. For example, it is conceivable to use the space below the transport conveyors (21) also as a passage for the transport vehicles (1). However, it is difficult to change the height of the transport conveyor (21) due to its combination with other devices as mentioned above. It is therefore difficult to secure a space that is wide in the up-down direction below the transport conveyor (21).

SUMMARY OF THE INVENTION

In view of the foregoing circumstances, there is a desire to secure a space that is wide in the up-down direction below the transport conveyor while maintaining the height of the transport conveyor at the predetermined height.

A technology for solving the foregoing problem is as follows.

A transport conveyor configured to transport an object to be transported in a transport direction, includes:

two support legs spaced apart from each other in the transport direction;

a frame supported by the two support legs and extending in the transport direction;

two guide bodies spaced apart from each other in the transport direction and supported by the frame; and an endless member wound around the two guide bodies and configured to circulate along a predetermined endless path, wherein the endless path includes: a first region extending linearly in the transport direction and constituting a transport surface on which the object to be transported is placeable, turn-back regions in which the endless path is turned back downward from respective end portions of the first region in the transport direction; and a second region continuous with the turn-back regions and extending in the transport direction below the first region, and the second region has, between the two support legs in the transport direction, a specific zone that is parallel with the first region and in which a spacing from the first region in an up-down direction is smaller than a smallest turn-back dimension corresponding to twice a smallest bending radius of the endless member.

According to this configuration, the dimension of the transport conveyor in the up-down direction can be kept small in the specific zone between the two support legs. Therefore, a space can easily be secured between the two support legs in the transport direction, below the endless path. Accordingly, according to this configuration, the space below the transport conveyor can be widely secured in the up-down direction while maintaining the height of the transport conveyor at a predetermined height. The space below the transport conveyor can be used as a passage for the transport vehicle to pass below the endless path, for example.

Further features and advantages of the technology according to the present disclosure will become more apparent in the description of the following exemplary and non-limiting embodiment that will be described with reference to the drawings.

DESCRIPTION OF THE INVENTION

Hereinafter, an embodiment of a transport conveyor and a transport apparatus equipped with this transport conveyor will be described while taking the case where they are provided in a transport facility as an example.

Figure 1:
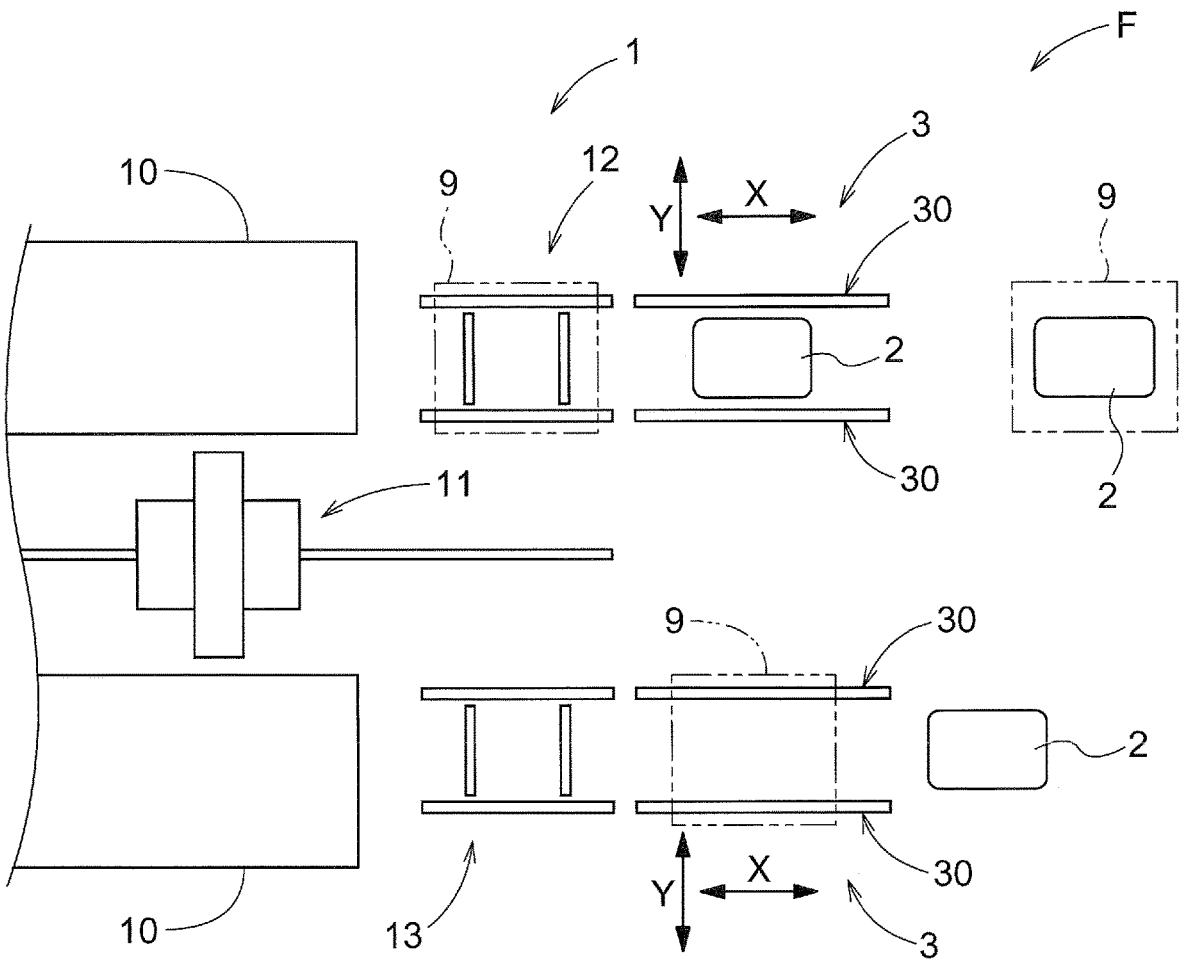
FIG. 1 is a plan view of a transport facility.

A transport facility F is a facility for transporting and storing objects to be transported 9, as shown in FIG. 1. The transport facility F in the present embodiment includes an automated warehouse 1, transport vehicles 2 that travel on a floor surface and transport the objects to be transported 9, and transport apparatuses 3 that transport the objects to be transported 9 between the automated warehouse 1 and the transport vehicles 2.

The automated warehouse 1 in the present embodiment includes storage racks 10 for storing the objects to be transported 9, a loading unit 12 serving as a waiting place for an object to be transported 9 that is to be loaded into a storage rack 10, an unloading unit 13 serving as a waiting place for an object to be transported 9 that has been unloaded from a storage rack 10, and a warehouse transport apparatus 11 that transports objects to be transported 9 between the storage racks 10 and the loading unit 12 and between the storage racks 10 and the unloading unit 13.

In the present embodiment, two storage racks 10 are located with the warehouse transport apparatus 11 therebetween. The warehouse transport apparatus 11 is configured as a stacker crane having a transfer device that is movable in the up-down direction and the horizontal direction. The loading unit 12 and the unloading unit 13 support objects to be transported 9 from below. For example, the loading unit 12 and the unloading unit 13 are configured as conveyors that transport objects to be transported 9 while supporting the objects to be transported 9 from below.

An object to be transported 9 that is to be loaded into the automated warehouse 1 is delivered from a transport vehicle 2 to a transport apparatus 3, and is transported to the loading unit 12 by the transport apparatus 3. This object to be transported 9 is then delivered to the warehouse transport apparatus 11 at the loading unit 12, and is transported to a storage rack 10 by the warehouse transport apparatus 11.

An object to be transported 9 that is to be unloaded from the automated warehouse 1 is transported from a storage rack 10 to the unloading unit 13 by the warehouse transport apparatus 11, and is delivered to a transport apparatus 3. The object to be transported 9 is then transported by the transport apparatus 3 and delivered to a transport vehicle 2.

Figure 2:
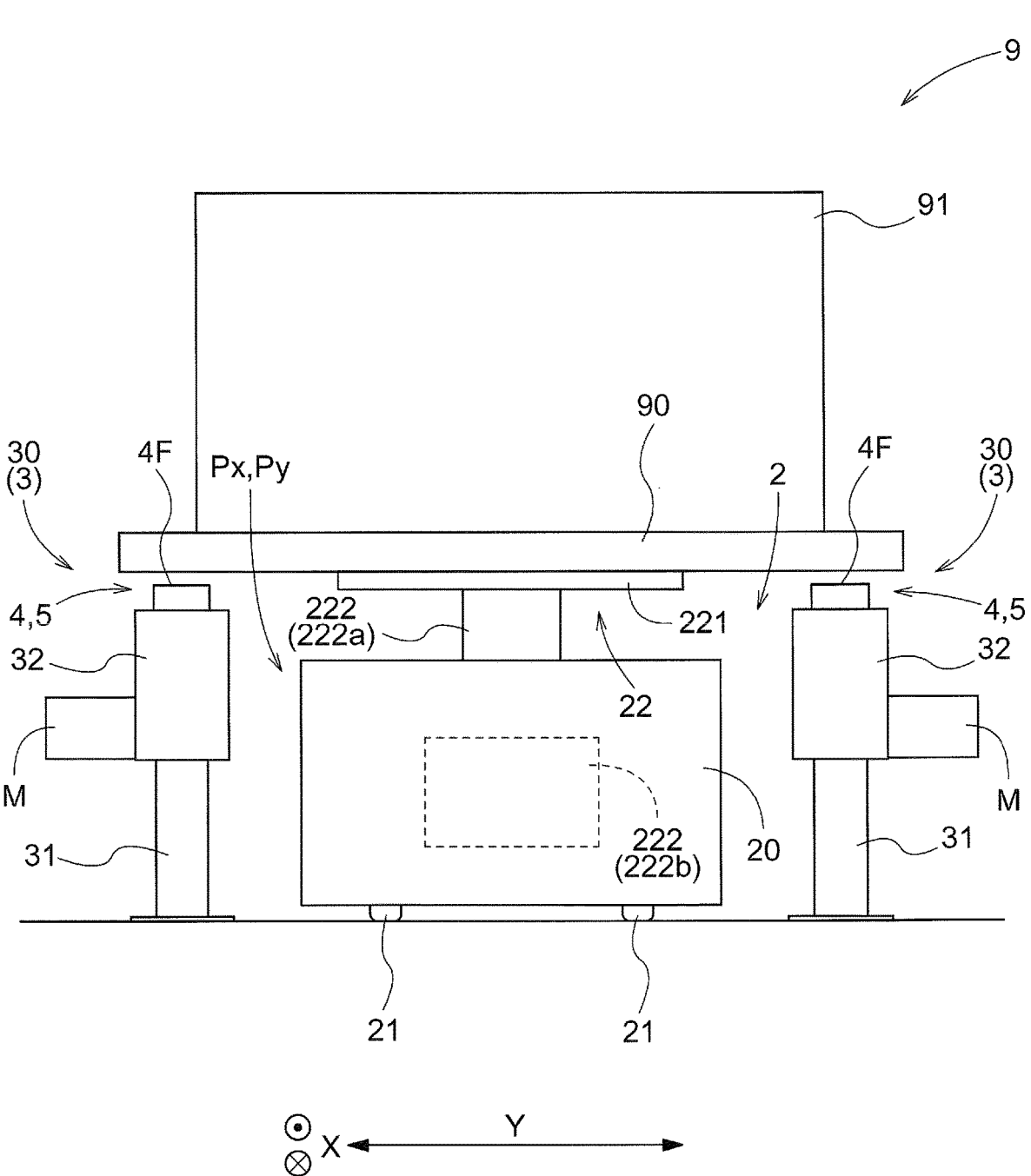
FIG. 2 shows the positional relationship between a transport apparatus and a transport vehicle as viewed in a transport direction.

Each object to be transported 9 in the present embodiment includes an article 91 and a pallet 90 on which the article 91 is placed, as shown in FIG. 2. The pallet 90 with the article 91 thereon is transported as an object to be transported 9. Also, only the pallet 90 without an article 91 thereon is transported as an object to be transported 9 in some cases.

Each transport apparatus 3 includes transport conveyors 30, as shown in FIG. 1. The transport conveyors 30 transport an object to be transported 9 in a transport direction X. The transport apparatus 3 in the present embodiment includes a pair of transport conveyors 30. The two transports conveyors 30 are spaced apart and parallel with each other in a width direction Y, which is a direction perpendicular to the transport direction X as viewed in the up-down direction. Each of the two transport conveyors 30 has a transport surface 4F on which an object to be transported 9 (more specifically, the pallet 90) is placed (see FIG. 2). The two transport surfaces 4F are located at the same height at positions spaced apart from each other in the width direction Y. The transport apparatus 3 transports the object to be transported 9 while levitating a bottom center part (center part in the width direction Y) thereof with use of the two transport conveyors 30. The details of the transport conveyor 30 will be described later.

Each transport vehicle 2 includes a carrier body 20, a plurality of travel wheels 21, and a transfer section 22 for transferring an object to be transported 9 to and from the transport apparatus 3, as shown in FIG. 2. The transport vehicle 2 transports an object to be transported 9 while passing through a passage that is predetermined on a floor surface. Although not specifically shown in the figures, the passage for the transport vehicle 2 to pass is predetermined by a position information storing unit, such as a barcode storing position information, or a magnetic tape, for example. The transport vehicle 2 travels based on information in the position information storing unit or travels along the magnetic tape.

The transfer section 22 in the present embodiment includes a mounting platform 221 on which an object to be transported 9 is placed, and a drive unit 222 for driving the mounting platform 221. The mounting platform 221 is located above the carrier body 20, and is driven by the drive unit 222 to move in the up-down direction. The drive unit 222 in this example includes an extendable section 222a that protrudes upward from the carrier body 20 and extends and retracts in the up-down direction, and a transfer drive source 222b for extending and retracting the extendable section 222a. The mounting platform 221 is connected to an upper part of the extendable section 222a and moves in the up-down direction in response to extension and retraction of the extendable section 222a. For example, the drive unit 222 includes a movement mechanism (e.g., a ball screw mechanism; not shown) that moves the extendable section 222a up and down, and the transfer drive source 222b is a motor that drives this movement mechanism. Note that the drive unit 222 may alternatively include a cylinder such as a hydraulic cylinder or an air cylinder, and the transfer drive source 222b may alternatively be a hydraulic pump, an air pump, or the like. Alternatively, the extendable section 222a may be constituted by a pantograph, for example.

Each transport vehicle 2 transfers an object to be transported 9 between the two transport conveyors 30 (transport apparatus 3) by moving the position of an upper face of the mounting platform 221 between an upper position at which the upper face is located above the transport surfaces 4F of the pair of transport conveyors 30 (transport apparatus 3) and a lower position at which the upper face is located below these transport surfaces 4F. Specifically, the transport vehicle 2 delivers an object to be transported 9 to the pair of transport conveyors 30 (transport apparatus 3) by moving the upper face of the mounting platform 221 from the upper position to the lower position with the object to be transported 9 placed on the mounting platform 221 (i.e., in the state shown in FIG. 2). Also, the transport vehicle 2 receives an object to be transported 9 from the pair of transport conveyors 30 (transport apparatus 3) by moving the upper face of the mounting platform 221 from the lower position to the upper position with the object to be transported 9 placed on the transport surfaces 4F of the pair of transport conveyors (transport apparatus 3).

Next, the details of the pair of transport conveyors 30 will be described with reference to FIG. 3. Note that the two transport conveyors 30 have the same configuration. For this reason, the following description will focus on the configuration of one of the two transport conveyors 30.

Figure 3:
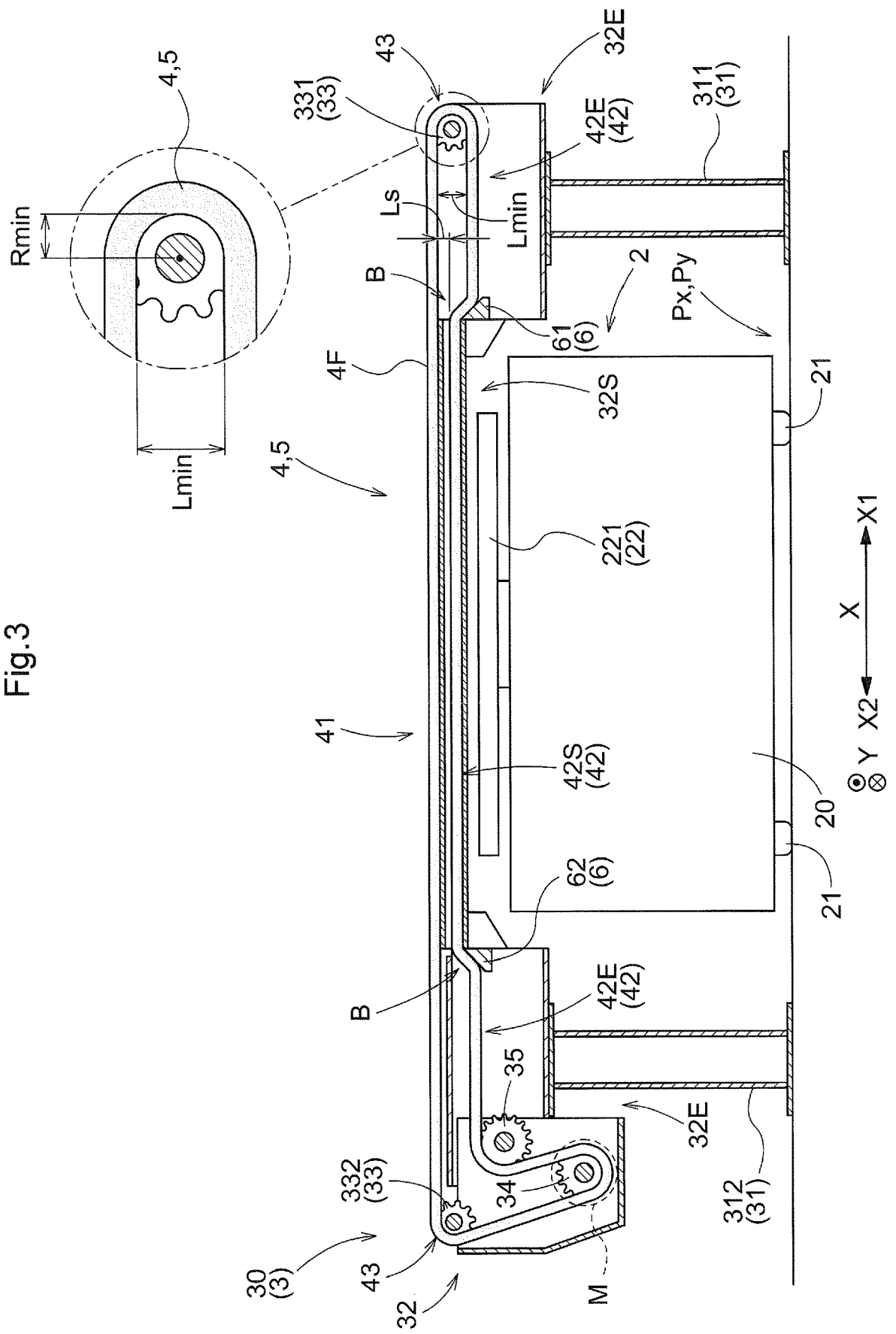
FIG. 3 shows the positional relationship between the transport apparatus and the transport vehicle as viewed in a width direction.

FIG. 3 shows the positional relationship between the transport conveyor 30 and the transport vehicle 2, an internal structure of the transport conveyor 30, and the like as viewed in the width direction Y. Note that, in the following, one side in the transport direction X will be referred to as a "transport-direction first side X1", and the other side in the transport direction X will be referred to as a "transport-direction second side X2".

The transport conveyor 30 includes two support legs 31 spaced apart in the transport direction X, a frame 32 supported by the two support legs 31 and extending in the transport direction X, two guide bodies 33 spaced apart in the transport direction X and supported by the frame 32, and an endless member 5 that is wound around the two guide bodies 33 and circulates along a predetermined endless path 4, as shown in FIG. 3. Each of the two transport conveyors 30 in the present embodiment includes a drive source M for driving the endless member 5. Accordingly, each of the two transport conveyors 30 independently generates a driving force for conveying objects to be transported 9.

The two support legs 31 support the frame 32 at positions above the floor surface that are spaced apart therefrom. The separation distance between the two support legs 31 in the transport direction X is at least longer than the horizontal dimensions of the transport vehicle 2 (the dimension in the transport direction X and the dimension in the width direction Y). The transport conveyor 30 in the present embodiment includes a first support leg 311 and a second support leg 312, which are the two support legs 31. The first support leg 311 is located on the transport-direction first side X1 relative to the second support leg 312. The second support leg 312 is located on the transport-direction second side X2 relative to the first support leg 311.

The frame 32 supports the two guides 33 and the endless member 5. The frame 32 in the present embodiment supports the drive source M, a driven body 34 that is driven by the drive source M and transmits the driving force of the drive source M to the endless member 5, and a tensioner 35 that adjusts looseness of the endless member 5. In this example, the two guide bodies 33, the driven body 34, and the tensioner 35 are each configured as a rotary body that rotates about an axis in the width direction Y. The endless member 5 in this example is configured as a chain, as will be described later. Therefore, in this example, the two guide bodies 33, the driven body 34, and the tensioner 35 are configured with use of sprockets.

The two guide bodies 33 are configured as rotary bodies (sprockets in this example) that rotate about axes in the width direction Y, as mentioned above. The transport conveyor 30 in the present embodiment includes a first guide body 331 and a second guide body 332, which are the two guide bodies 33. The first guide body 331 is located on the transport-direction first side X1 relative to the second guide body 332. The second guide body 332 is located on the transport-direction second side X2 relative to the first guide body 331. The first guide body 331 and the second guide body 332 in this example are located at the same height. Specifically, an upper end of the first guide body 331 and an upper end of the second guide body 332 are located at the same height.

The separation distance between the first guide body 331 and the second guide body 332 in the transport direction X is at least longer than the horizontal dimensions of the transport vehicle 2 (the dimension in the transport direction X and the dimension in the width direction Y). In the present embodiment, the separation distance between the first guide body 331 and the second guide body 332 in the transport direction X is longer than the separation distance between the two support legs 31, namely between the first support leg 311 and the second support leg 312 in the transport direction X. The first guide body 331 in this example is located on the transport-direction first side X1 relative to the first support leg 311. The second guide body 332 is located on the transport-direction second side X2 relative to the second support leg 312. Note that the driven body 34 and the tensioner 35 in this example are located below the second guide body 332. Specifically, the driven body 34 and the tensioner 35 are located on the transport-direction second side X2 relative to the second support leg 312 and below the second guide body 332. In the example shown in the figure, the driven body 34 and the tensioner 35 are located between the second support leg 312 and the second guide body 332 in the transport direction X.

The endless member 5 extends along the endless member 4. That is, the endless path 4 is a path extending along the region where the endless member 5 is located. Accordingly, it may be said that the endless member 5 constitutes the endless path 4. The endless member 5 in the present embodiment extends along the endless path 4, or constitutes the endless path 4, by being wound around the two guide bodies 33 (first guide body 331 and second guide body 332), the driven body 34, and the tensioner 35. Note that the endless member 5 in this example is configured as a chain, as mentioned above.

The endless path 4 includes a first region 41 that extends linearly in the transport direction X and constitutes the transport surface 4F on which an object to be transported 9 (more specifically, pallet 90) is placed, turn-back regions 43 that are turned back downward from both end portions of the first region 41 in the transport direction X, and a second region 42 that is continuous with the turn-back regions 43 and extends in the transport direction X below the first region 41.

In the present embodiment, the first guide body 331 is located at an end portion of the endless path 4 on the transport-direction first side X1. The endless path 4 is turned back downward by the first guide body 331 and forms one of the turn-back regions 43. Also, the second guide body 332 is located at an end portion of the endless path 4 on the transport-direction second side X2. The endless path 4 is turned back downward by the second guide body 332 and forms the other one of the turn-back regions 43. Here, each turn-back region 43 is a region that is curved in an arc shape as viewed in the width direction Y.

The first guide body 331 and the second guide body 332 that form the respective turn-back region 43 are located at the same height, as mentioned above. Therefore, in this example, the first region 41 between the two turn-back regions 43 extends in the horizontal direction.

The transport surface 4F is constituted by an upper face of the first region 41. The height of the transport surface 4F is constant. The transport surface 4F in the present embodiment is located above the upper face of the mounting platform 221 while the mounting platform 221 of the transport vehicle 2 is located at the lower position. Also, the transport surface 4F is located below the upper face of the mounting platform 221 while the mounting platform 221 of the transport vehicle 2 is located at the upper position (see FIG. 2).

The second region 42 has, between the two support legs 31 (first support leg 311 and second support leg 312) in the transport direction X, a specific zone 42S that is parallel with the first region 41 and in which the spacing from the first region 41 in the up-down direction (the spacing denoted as "Ls" in the figure) is smaller than the smallest turn-back dimension Lmin, which corresponds to twice the smallest bending radius Rmin of the endless member 5. That is, in the specific zone 42S, the spacing Ls between the first region 41 and the second region 42 in the up-down direction is smaller than the smallest turn-back dimension Lmin, and the first region 41 and the second region 42 are parallel with each other.

Here, the "smallest bending radius Rmin" refers to the radius of the smallest arc that can be formed by the endless member 5 when the endless member 5 is bent or curved to turn back. The smallest bending radius Rmin varies depending on the characteristics of members that constitute the endless member 5. The "smallest turn-back dimension Lmin" in this example is twice the smallest bending radius Rmin, and can alternatively be referred to as the smallest bending diameter, for example. In the present embodiment, the guide bodies 33 that constitute the turn-back regions 43 are sprockets (rotary bodies), and the radius of each of these sprockets (specifically, the radius based on the root circle of the sprocket) is the same as the minimum bending radius Rmin. Therefore, in the present embodiment, the diameter of the sprocket (specifically, the root circle diameter of the sprocket) serving as each guide body 33 is the same as the smallest turn-back dimension Lmin (smallest bending diameter).

Since the transport conveyor 30 is configured as described above, the dimension of the transport conveyor 30 in the up-down direction can be kept small in the specific zone 42S between the two support legs 31. Therefore, a space can easily be secured between the two support legs 31 in the transport direction X, below the endless path 4. Accordingly, the space below the transport conveyor 30 can be widely secured in the up-down direction while maintaining the height of the conveyor 30 at a predetermined height. In the transport facility F equipped with the transport vehicles 2 as in the present embodiment, the aforementioned space below the transport conveyor 30 can be used as a passage for the transport vehicles 2 to pass below the endless path 4.

The specific zone 42S in the present embodiment is located above the upper face of the mounting platform 221 while the mounting platform 221 of a transport vehicle 2 is located at the lower position. This enables the space below the specific zone 42S to be used as a passage for the transport vehicle 2.

The second region 42 in the present embodiment has outer zones 42E in which the spacing from the first region 41 in the up-down direction is larger than or equal to the smallest turn-back dimension Lmin, on both outer sides of the specific zone 42S in the transport direction X. That is, the outer zones 42E are located on both the transport-direction first side X1 and the transport-direction second side X2 relative to the specific zone 42S. In these outer zones 42E, the spacing between the first region 41 and the second region 42 in the up-down direction is larger than or equal to the smallest turn-back dimension Lmin. Since the spacing between the first region 41 and the second region 42 in the up-down direction is less constrained in the outer zones 42E, the endless path 4 can be set more freely, and the driven body 34 and the tensioner 35 over which the endless member 5 is wound around can also be arranged more freely.

In the present embodiment, the outer zones 42E are partially or entirely located below the upper face of the mounting platform 221 while the mounting platform 221 of a transport vehicle 2 is located at the lower position. That is, at least lower end portions of the outer zones 42E are located below the mounting platform 221 that is located at the lower position.

In the present embodiment, the spacing between the first region 41 and the second region 42 in the up-down direction is largest in the area of an outer zone 42E in which the driven body 34 is located. That is, in this example, a lower end portion of the outer zone 42E is in the area of the outer zone 42E in which the driven body 34 is located. The above configuration enables the drive source M for driving the driven body 34 to be arranged in a relatively wide space in which the drive source M is unlikely to interfere with the other members.

Path-changing members 6, which shifts the position of the endless path 4 in the up-down direction so that the specific zone 42S is above the outer zones 42E, are located in boundary areas B between the outer zones 42E and the specific zone 42S. Two path-changing members 6 are supported by the frame 32 and spaced apart from each other in the transport direction X. Each of the two path-changing members 6 in the present embodiment is constituted by a resin guide member.

In the present embodiment, the two path-changing members 6, namely a first path-changing member 61 and a second path-changing member 62 are supported by the frame 32. The first path-changing member 61 is located on the transport-direction first side X1 relative to the second path-changing member 62. The first path-changing member 61 has an inclined face that inclines upward while extending from the transport-direction first side X1 toward the transport-direction second side X2. The endless path 4 is guided upward by this inclined face. The second path-changing member 62 is located on the transport-direction second side X2 relative to the first path-changing member 61. The second path-changing member 62 has an inclined face that inclines upward while extending from the transport-direction second side X2 toward the transport-direction first side X1. The endless path 4 is guided upward by this inclined face.

The specific zone 42S is constituted by an area of the second region 42 of the endless path 4 between the first path-changing member 61 and the second path-changing member 62. The outer zones 42E are constituted by an area of the second region 42 of the endless path 4 that is located on the transport-direction first side X1 relative to the first path-changing member 61 and an area that is located on the transport-direction second side X2 relative to the second path-changing member 62.

In the present embodiment, the first path-changing member 61 and the second path-changing member 62 are located at the same height. Therefore, the specific zone 42S between the first path-changing member 61 and the second path-changing member 62 extends in the horizontal direction. That is, in this example, both the first region 41 and the specific zone 42S of the second region 42 extend in the horizontal direction. Note that "extending in the horizontal direction" also includes the case of extending while inclining relative to the horizontal direction to an acceptable extent.

The frame 32 in the present embodiment includes a specific region 32S, which is a region in the transport direction X that corresponds to the specific zone 42S, and outer regions 32E, which are regions on both outer sides of the specific region 32S in the transport direction X. The dimension of the frame 32 in the up-down direction in the specific region 32S is smaller than the dimension of the frame 32 in the up-down direction in the outer regions 32E. This enables the space below the transport conveyor 30 to be widely secured in the up-down direction below the specific region 32S. In addition, the strength of the frame 32 can be appropriately ensured in the outer regions 32E.

In the present embodiment, the specific region 32S of the frame 32 is located above the upper face of the mounting platform 221 while the mounting platform 221 of a transport vehicle 2 is located at the lower position. This enables the space below the specific region 32S to be used as a passage for the transport vehicle 2. Note that a lower end portion of the specific region 32S of the frame 32 is located below the specific zone 42S of the endless path 4. This enables the endless member 5 to be appropriately supported in the specific zone 42S of the endless path 4.

In the present embodiment, the lower face of the frame 32 in the specific region 32S has a flat shape parallel with the transport direction X. This enables the space below the transport conveyor 30 to be widely secured in the transport direction X. In this example, the lower face of the frame 32 in the specific region 32S has a flat shape parallel with the transport direction X at least in a longer area than the horizontal dimensions of the mounting platform 221 of the transport vehicle 2 (the dimension in the transport direction X and the dimension in the width direction Y).

In the present embodiment, the outer regions 32E of the frame 32 are partially located below the upper face of the mounting platform 221 while the mounting platform 221 of a transport vehicle 2 is located at the lower position. In this example, the lower faces of the outer regions 32E are entirely located below the upper face of the mounting platform 221 while the mounting platform 221 of a transport vehicle 2 is located at the lower position.

Figure 4:
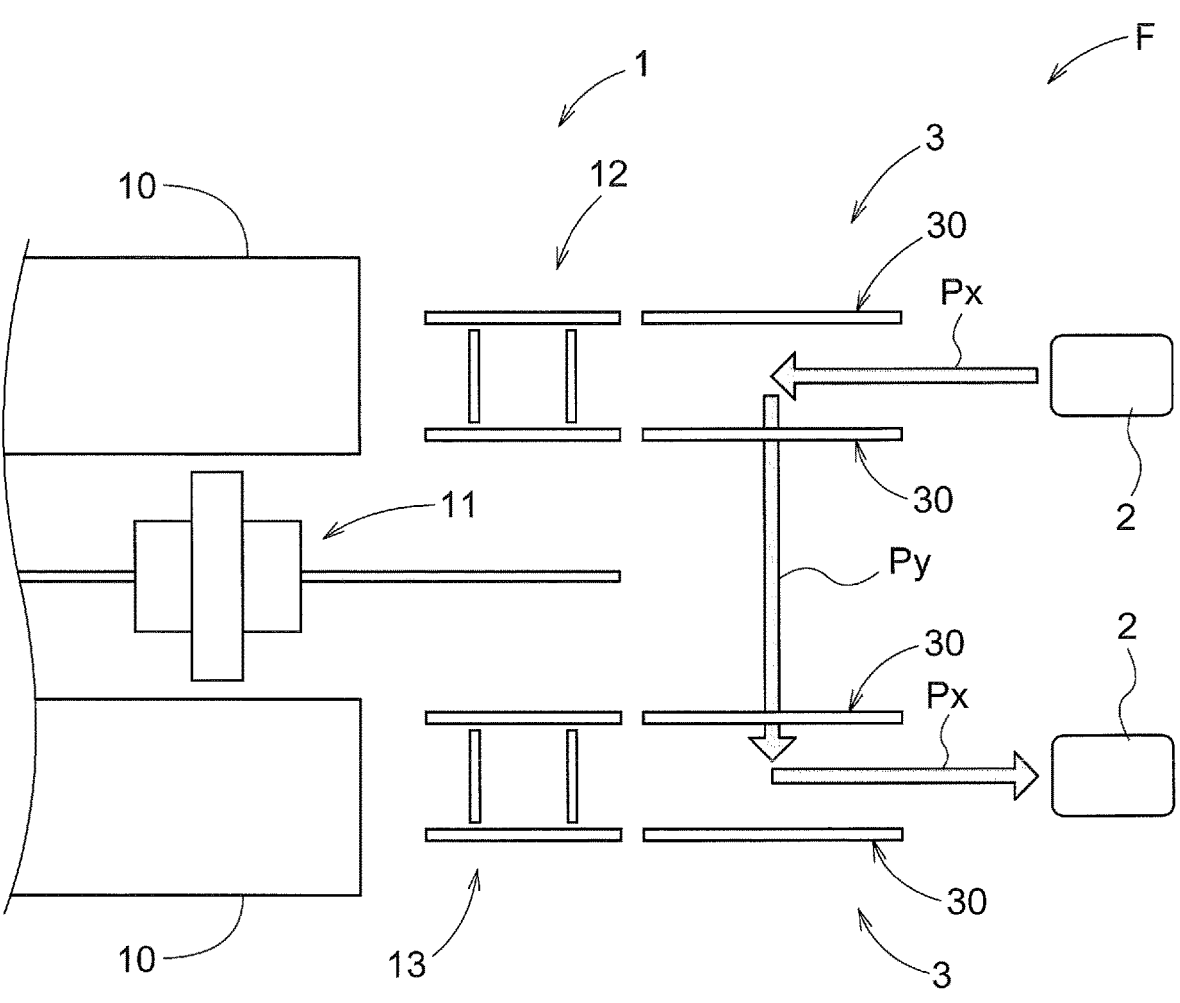
FIG. 4 is a plan view of a passage of the transport vehicle.

In the present embodiment, a transport-direction passage Px through which a transport vehicle 2 passes in the transport direction X is provided between the two transport conveyors 30 in the width directions Y, as shown in FIGS. 2 and 4. The transport vehicle 2 passes through the transport-direction passage Px, stops between the two transport conveyors 30, and transfers an object to be transported 9 between the two transport conveyors 30.

In the present embodiment, the drive source M protrudes outward in the width direction Y relative to the frame 32 in each of the two transport conveyors 30. This prevents the transport vehicle 2 passing through the transport-direction passage Px formed on the inner side of the two transport conveyors 30 in the width direction Y from interfering with the drive source M. The two transport conveyors 30 do not overlap the movement path of the transport vehicle 2 passing through the transport-direction passage Px as viewed in the transport direction X. That is, not only the drive source M but also the other elements constituting the transport conveyors 30 are located at positions at which they do not interfere with the transport vehicle 2 passing through the transport-direction passage Px. The above configuration enables the space below the two transport conveyors 30 to be used as a passage (transport-direction passage Px) through which the transport vehicle 2 can pass in the transport direction X without interfering with these two transport conveyors 30. The transport vehicle 2 in this example performs a turning operation on the spot to change the traveling direction. Therefore, the two transport conveyors 30 in this example do not overlap the movement path of the transport vehicle 2 while performing the turning operation between the two transport conveyors 30.

In the present embodiment, a width-direction passage Py through which a transport vehicle 2 passes in the width direction Y is provided below the endless path 4 between the two support legs 31 in the transport direction X, as shown in FIGS. 3 and 4. This enables the transport vehicle 2 to pass through the width-direction passage Py and retreat from a transfer place (transport apparatus 3) after stopping between the two transport conveyors 30 and transferring (delivering) an object to be transported 9 to or from these transport conveyors 30. The transport vehicle 2 is capable of passing through the width-direction passage Py, and thus need not return to the path (transport-direction passage Px) from which the transport vehicle 2 came (see FIG. 4). Accordingly, when a plurality of transport vehicles 2 sequentially transfer objects to be transported 9 to and from the transport apparatus 3, each transport vehicle 2 can smoothly transfer the object to be transported 9.

In the present embodiment, the drive source M is located outward of the specific zone 42S in the transport direction X in each of the two transport conveyors 30 (see FIG. 3). This prevents the transport vehicle 2 passing through the width-direction passage Py below the specific zone 42S from interfering with the drive source M. In this example, the drive source M is located outward of one of the two support legs 31 in the transport direction X in each of the two transport conveyors 30. In the example shown in FIG. 3, the drive source M is located on the transport-direction second side X2 relative to the second support leg 312. The two support legs 31, the frame 32, and the endless path 4 do not overlap the movement path of the transport vehicle 2 passing through the width-direction passage Py as viewed in the width direction Y. That is, not only the drive source M but also the other elements constituting the transport conveyors 30 are located at positions at which they do not interfere with the transport vehicle 2 passing through the width-direction passage Py. The above configuration enables the space below the two transport conveyors 30 to be used as a passage (width-direction passage Py) through which the transport vehicle 2 can pass in the width direction Y without interfering with these transport conveyors 30. In this example, the two support legs 31, the frame 32, and the endless path 4 do not overlap the movement path of the transport vehicle 2 performing the turning operation between the two transport conveyors 30.

With the above-described transport conveyors 30 and the transport apparatus 3 equipped with these transport conveyors 30, the space below the transport conveyors 30 can be widely secured in the up-down direction while maintaining the height of the transport conveyors 30 at a predetermined height. Particularly, in the transport facility F equipped with the transport vehicles 2 as in the above embodiment, the space below the above-described transport conveyors 30 can be used as a passage for the transport vehicles 2 to pass through.

Other Embodiments

Next, other embodiments of a transport conveyor and a transport apparatus equipped with the transport conveyor will be described.

(1) The above embodiment has described an example in which the guide bodies 33 that form the turn-back regions 43 are sprockets, and the radius of each of these sprockets is the same as the smallest bending radius Rmin. However, there is no limitation to this example. The radius of the sprocket as each guide body 33 may be larger than the smallest bending radius Rmin.

(2) The above embodiment has described an example in which the endless member 5 is configured as a chain, and the two guide bodies 33, the driven body 34, and the tensioner 35 are configured with use of sprockets. However, there is no limitation to this example. Alternatively, the endless member 5 may be constituted by a belt (or a toothed belt), and the two guide bodies 33, the driven body 34, and the tensioner 35 may be configured with use of pulleys (or toothed pulleys).

(3) The above embodiment has described an example in which the two guide bodies 33 are configured as rotary bodies that rotate about respective axes in the width direction Y. However, there is no limitation to this example. The two guide bodies 33 need only turn back and guide the endless member 5. For example, at least one of the two guide bodies 33 may be configured as a guide member whose position and orientation are fixed relative to the frame 32. This guide member favorably contains a resin having a small friction coefficient as a main component, for example.

(4) The above embodiment has described an example in which each of the two path-changing members 6 is constituted by a resin guide member having an inclined face. However, there is no limitation to this example. At least one of the two path-changing members 6 may alternatively be a sprocket if the endless member 5 is a chain, or may be a pulley (toothed pulley) if the endless member 5 is a belt (toothed belt).

(5) The above embodiment has described an example in which the lower face of the frame 32 in the specific region 32S has a flat shape parallel with the transport direction X. However, there is no limitation to this example. The lower face of the frame 32 in the specific region 32S may alternatively have a shape that is uneven relative to a virtual plane parallel with the transport direction X.

(6) The above embodiment has described an example in which the drive source M protrudes outward in the width direction Y relative to the frame 32 in each of the two transport conveyors 30. However, there is no limitation to this example. The drive source M in each transport conveyor 30 may be located at any position as long as it does not overlap the movement path of the transport vehicle 2 passing through the transport-direction passage Px and the width-direction passage Py.

(7) The above embodiment has described an example in which the two transport conveyors 30 each include a drive source M for driving the corresponding endless member 5. However, there is no limitation to this example. Alternatively, one drive source M may drive the endless members 5 in the two transport conveyors 30. In this case, it is favorable that a driving force transmission mechanism for transmitting the driving force generated by the one drive source M to the two endless members 5 is provided.

(8) The above embodiment has described an example in which the warehouse transport apparatus 11 is configured as a stacker crane equipped with a transfer device capable of moving in the up-down direction and the horizontal direction. However, there is no limitation to this example. The warehouse transport apparatus 11 may alternatively include a conveyor, a lifter, transport carriages provided for respective shelves of the storage racks 10, or the like, for example.

(9) The above embodiment has described an example in which the warehouse transport apparatus 11 transports objects to be transported 9 between the loading unit 12 and the unloading unit 13. However, there is no limitation to this example. The transfer may be carried out by an operator.

(10) The above embodiment has described an example in which each object to be transported 9 includes an article 91 and a pallet 90 on which the article 91 is placed. However, there is no limitation to this example. The object to be transported 9 need not include the pallet 90.

(11) Note that the configuration disclosed in the above embodiment can also be applied in combination with configurations disclosed in other embodiments as long as no contradiction arises. Regarding other configurations as well, the embodiment disclosed in the present specification is merely an example in all respects. Accordingly, various modifications can be made as appropriate without departing from the gist of the present disclosure.

SUMMARY OF THE EMBODIMENT

The above-described transport conveyer and the transport apparatus equipped with the transport conveyer will be described below.

A transport conveyor configured to transport an object to be transported in a transport direction, includes:

two support legs spaced apart from each other in the transport direction;

a frame supported by the two support legs and extending in the transport direction;

two guide bodies spaced apart from each other in the transport direction and supported by the frame; and an endless member wound around the two guide bodies and configured to circulate along a predetermined endless path, wherein the endless path includes: a first region extending linearly in the transport direction and constituting a transport surface on which the object to be transported is placeable, turn-back regions in which the endless path is turned back downward from respective end portions of the first region in the transport direction; and a second region continuous with the turn-back regions and extending in the transport direction below the first region, and the second region has, between the two support legs in the transport direction, a specific zone that is parallel with the first region and in which a spacing from the first region in an up-down direction is smaller than a smallest turn-back dimension corresponding to twice a smallest bending radius of the endless member.

According to this configuration, the dimension of the transport conveyor in the up-down direction can be kept small in the specific section between the two support legs. Therefore, a space can easily be secured between the two support legs in the transport direction, below the endless path. Accordingly, according to this configuration, the space below the transport conveyor can be widely secured in the up-down direction while maintaining the height of the transport conveyor at a predetermined height. The space below the transport conveyor can be used as a passage for the transport vehicle to pass below the endless path, for example.

It is preferable that the second region has outer zones in which the spacing from the first region in the up-down direction is not smaller than the smallest turn-back dimension, on respective outer sides of the specific zone in the transport direction, and the transport conveyor further comprises path-changing members located in boundary areas between the outer zones and the specific zone and shifting a position of the endless path in the up-down direction such that the specific zone is above the outer zones.

According to this configuration, the specific zone can be arranged above the outer zones by shifting the position of the endless path in the up-down direction with use of the path-changing member. Accordingly, the space below the transport conveyor can be widely secured in the up-down direction below the specific zone.

It is preferable that the frame includes a specific region, which is a region in the transport direction corresponding to the specific zone, and outer regions, which are regions on respective outer sides of the specific region in the transport direction, and the frame has, in the specific region, a dimension in the up-down direction that is smaller than a dimension of the frame in the up-down direction in the outer regions.

According to this configuration, the space below the transport conveyor can easily be secured widely below the specific region while appropriately ensuring the strength of the frame in the outer regions.

It is preferable that the frame has, in the specific region, a lower face having a flat shape parallel with the transport direction.

According to this configuration, the space below the transport conveyor can easily be secured widely in the transport direction.

It is preferable that in a view in a width direction perpendicular to the transport direction as viewed in the up-down direction, the two support legs, the frame, and the endless path do not overlap a movement path of a transport vehicle, which is configured to transport the object to be transported, while the transport vehicle is passing in the width direction along a width-direction passage located below the endless path between the two support legs in the transport direction.

According to this configuration, the space below the transport conveyor can be used as a width-direction passage through which the transport vehicle can pass without interfering with the transport conveyor.

A transport apparatus equipped with two of the transport conveyors having the above configuration, wherein the two transport conveyors are parallel with each other and spaced apart from each other in a width direction perpendicular to the transport direction as viewed in the up-down direction, each of the two transport conveyors includes a drive source configured to drive the endless member, the drive source is located outward of the specific zone in the transport direction in each of the two transport conveyors, and in a view in the transport direction, the two transport conveyors do not overlap a movement path of a transport vehicle, which is configured to transport the object to be transported, while the transport vehicle passing in the transport direction along a transport-direction passage located between the two transport conveyors in the width direction.

According to this configuration, the space below the two transport conveyors can be used as a passage through which the transport vehicle can pass in the transport direction and the width direction without interfering with these transport conveyors.

INDUSTRIAL APPLICABILITY

The technology according to the present disclosure can be used in a transport conveyor that transports an object to be transported in a transport direction, and a transport apparatus equipped with this transport conveyor.

What is claimed is:

1. A transport conveyor to transport an object to be transported in a transport direction, comprising:

two support legs spaced apart from each other in the transport direction;

a frame supported by the two support legs and extending in the transport direction;

two guide bodies spaced apart from each other in the transport direction and supported by the frame;

a tensioner spaced below one of the two guide bodies and supported by the frame; and an endless member wound around the two guide bodies and the tensioner, the endless member configured to circulate along a predetermined endless path, wherein the endless path comprises:

a first region extending linearly in the transport direction and constituting a transport surface on which the object to be transported is placeable;

turn-back regions in which the endless path is turned back downward from respective end portions of the first region in the transport direction; and a second region continuous with the turn-back regions and extending in the transport direction below the first region, and wherein the second region has, between the two support legs in the transport direction, a specific zone that is parallel with the first region and in which a spacing from the first region in an up-down direction is smaller than a smallest turn-back dimension corresponding to twice a smallest bending radius of the endless member, wherein the frame includes a specific region, which is a region in the transport direction corresponding to the specific zone, and outer regions, which are regions on respective outer sides of the specific region in the transport direction, and the frame has, in the specific region, a dimension in the up-down direction that is smaller than a dimension of the frame in the up-down direction in the outer regions, wherein a transport vehicle, which is configured to transport the object to be transported, is allowed to pass in a width direction perpendicular to the transport direction as viewed in the up-down direction, along a width-direction passage located below the endless path between the two support legs in the transport direction, and wherein the specific region is above the transport vehicle, and a lower end of the outer region is below an upper end of a carrier body of the transport vehicle, and the outer region of the frame and the transport vehicle partially overlap in the up-down direction as viewed in the transport direction when the transport vehicle is under the specific region of the frame.

2. The transport conveyor according to claim 1, wherein the second region has outer zones in which the spacing from the first region in the up-down direction is not smaller than the smallest turn-back dimension, on respective outer sides of the specific zone in the transport direction, and wherein the transport conveyor further comprises path-changing members located in boundary areas between the outer zones and the specific zone and shifting a position of the endless path in the up-down direction such that the specific zone is above the outer zones, and each of the path-changing members is constituted by a guide member having a linear inclined face, the endless path extending upward from the outer zone to the specific zone along the linear inclined face.

3. The transport conveyor according to claim 1, wherein the frame includes a specific region, which is a region in the transport direction corresponding to the specific zone, and outer regions, which are regions on respective outer sides of the specific region in the transport direction, and wherein the frame has, in the specific region, a dimension in the up-down direction that is smaller than a dimension of the frame in the up-down direction in the outer regions.

4. The transport conveyor according to claim 3, wherein the frame has, in the specific region, a lower face having a flat shape parallel with the transport direction.

5. The transport conveyor according to claim 1, wherein in a view in a width direction perpendicular to the transport direction as viewed in the up-down direction, the two support legs, the frame, and the endless path do not overlap a movement path of a transport vehicle, which is configured to transport the object to be transported, while the transport vehicle is passing in the width direction along a width-direction passage located below the endless path between the two support legs in the transport direction.

\* \* \* \* \*